US010529094B2

(12) United States Patent
Magielse

(10) Patent No.: US 10,529,094 B2
(45) Date of Patent: Jan. 7, 2020

(54) COLOR PICKER

(71) Applicant: SIGNIFY HOLDING B.V., Eindhoven (NL)

(72) Inventor: Remco Magielse, Tilburg (NL)

(73) Assignee: SIGNIFY HOLDING B.V., Eindhoven (NL)

(*) Notice: Subject to any disclaimer, the term of this patent is extended or adjusted under 35 U.S.C. 154(b) by 71 days.

(21) Appl. No.: 15/563,857

(22) PCT Filed: Mar. 17, 2016

(86) PCT No.: PCT/EP2016/055876
§ 371 (c)(1),
(2) Date: Oct. 2, 2017

(87) PCT Pub. No.: WO2016/156060
PCT Pub. Date: Oct. 6, 2016

(65) Prior Publication Data
US 2018/0075626 A1 Mar. 15, 2018

(30) Foreign Application Priority Data
Mar. 31, 2015 (EP) ..................................... 15161985

(51) Int. Cl.
G06K 9/00 (2006.01)
G06T 11/00 (2006.01)
(Continued)

(52) U.S. Cl.
CPC .......... *G06T 11/001* (2013.01); *G06F 3/0481* (2013.01); *G06F 3/0488* (2013.01);
(Continued)

(58) Field of Classification Search
CPC ........ G06T 11/001; G06T 7/11; G06F 3/0481; G06F 3/04842; G06F 3/0488; H05B 33/0863; H05B 33/0845
(Continued)

(56) References Cited
U.S. PATENT DOCUMENTS 6,611,297 B1 * 8/2003 Akashi ............... H04N 21/4131
348/602
8,878,991 B2 * 11/2014 Cook ................... H05B 37/029
348/460
(Continued)

FOREIGN PATENT DOCUMENTS

EP 2651190 A2 10/2013
WO 2007052195 A1 5/2007
(Continued)

*Primary Examiner* — Van D Huynh
(74) *Attorney, Agent, or Firm* — Meenakshy Chakravorty

(57) ABSTRACT

A method of controlling a lighting system comprising one or more luminaires for illuminating an environment. The method comprises: outputting a displayed image to a user on a screen of a user interface; allowing the user to select a region from amongst a plurality of regions in the displayed image each having a respective color; and controlling one or more of the luminaires of the lighting system to emit illumination rendering the color of the region selected by the user from the displayed image. The displayed image is determined based on the source image, the displayed image being a modification of the source image modified to account for an insusceptibility of one or more colors in the source image to be rendered through the illumination emitted by the lighting system.

14 Claims, 2 Drawing Sheets

(51) Int. Cl.
    *G06F 3/0488*     (2013.01)
    *G06F 3/0484*     (2013.01)
    *H05B 33/08*     (2006.01)
    *G06T 7/11*     (2017.01)
    *G06F 3/0481*     (2013.01)

(52) U.S. Cl.
    CPC ............ *G06F 3/04842* (2013.01); *G06T 7/11* (2017.01); *H05B 33/0863* (2013.01); *H05B 33/0845* (2013.01)

(58) Field of Classification Search
    USPC .......................................................... 382/164
    See application file for complete search history.

(56) References Cited

U.S. PATENT DOCUMENTS

| | | | |
|---|---|---|---|
| 2009/0122086 A1* | 5/2009 | Diederiks | H05B 37/02 345/690 |
| 2013/0271004 A1* | 10/2013 | Min | H05B 33/0842 315/112 |
| 2014/0091731 A1* | 4/2014 | Fushimi | H05B 37/0245 315/292 |
| 2016/0262239 A1* | 9/2016 | Hole | H05B 33/0863 |

FOREIGN PATENT DOCUMENTS

| | | | | |
|---|---|---|---|---|
| WO | WO-2007052195 A1 * | 5/2007 | ......... | H05B 37/0245 |
| WO | 2012085742 A1 | 6/2012 | | |
| WO | 2013121311 A1 | 8/2013 | | |

\* cited by examiner

US 10,529,094 B2

COLOR PICKER

CROSS-REFERENCE TO PRIOR APPLICATIONS

This application is the U.S. National Phase application under 35 U.S.C. § 371 of International Application No. PCT/EP2016/055876, filed on Mar. 17, 2016, which claims the benefit of European Patent Application No. 15161985.5, filed on Mar. 31, 2015. These applications are hereby incorporated by reference herein.

TECHNICAL FIELD

The present disclosure relates to a color picker such as a color picker application running on a mobile phone or tablet, which allows a user to select a region from an image such as a photograph and, based on the color of the selected region, thereby select a color with which a lighting system comprising one or more luminaires will emit its illumination into an environment such as a room.

BACKGROUND

An existing color picker application (or "app") provides a way for a user to control the color of the illumination emitted from one or more luminaires of a lighting system (where the luminaires may be conventional ceiling or wall mounted luminaires, free standing luminaires or wall washers, or less conventional types of luminaire such as illumination sources built into surfaces or furniture, or any other type of illumination source for emitting illumination into an environment so as to illuminate the environment). The color picker app displays an image to the user on a screen of the user terminal on which it is running, e.g. the image being a photograph captured by an in-built camera of the user terminal, or a photograph or other type of image downloaded to an internal storage of the user terminal. The app then allows the user to select a region in the displayed image having a particular color (whether defined by a specific set of color space values or a range of color values), from amongst a plurality of regions in the image having a plurality of different respective colors. Once the user has selected the desired region, the app samples the color from the selected region and controls the lighting system to render a lighting scene comprising the color in question, via the illumination emitted from one or more of the luminaires of the lighting system.

This provides a user-friendly way for the user to select a lighting scene, in that the user can select an image that or he or she appreciates and then simply select one or more colors from this image.

However, due to limitations in the output of the one or more luminaires, certain colors are difficult (e.g. deep saturation) or impossible (e.g. brownish/black colors) to render by means of the luminaire(s). As an example, a nominally red light source may in practice be more orange and as such creating deep red colors is difficult. As another example, there could be limitations on the amount of blue light a luminaire is allowed to emit, in order to avoid damage (in the long run) to a reflector in the luminaire due to the high energy of the blue light. Other colors are impossible to render with a luminaire, such as brown or grey.

WO 2012/085742 discloses a color picker application which receives a selection from a user of a certain colored region in an image, but then adapts the actual color with which to emit from the lighting system depending on its capability to render the selected color.

SUMMARY

However, the color picker application of WO 2012/085742 only makes this adaptation "behind the user's back": it does not revert to the user first. That is, it does not let the user know that his or her selected color will not be possible or will not be faithfully reproduced, nor feedback the adaptation as a proposal to the user to allow the user a choice as to whether the adapted color is indeed a desirable alternative. To address such concerns, the present invention instead adapts the image displayed to the user (which may comprise changing only a part or a whole of the source image) to better match the capabilities of the luminaire(s), in order to provide the user with a better impression of the possible lighting colors.

Hence according to one aspect disclosed herein, there is provided a user terminal comprising: a communications interface for communicating with a lighting system comprising one or more luminaires for illuminating an environment; a user interface comprising a screen, the user interface being configured to output a displayed image (20') to a user of the user terminal on said screen, and to allow the user to select a region from amongst a plurality of regions in the displayed image each having a respective color; and a controller configured to control one or more of the luminaires of the lighting system, via said communications interface, to emit illumination rendering the color of the region selected by the user from the displayed image; wherein the controller is configured to determine the displayed image based on the source image, the displayed image being a modification of the source image modified to account for an insusceptibility of one or more colors in the source image to be rendered through said illumination.

That is, the modification reflects the capacity or capability of one or more colors to be rendered by the lighting system—i.e. to take into account the fact that the one or more colors in question may not be capable of being rendered, or not being rendered faithfully. Note that this insusceptibility or lack of capacity to being rendered could be an inherent property of the color itself that applies to all or at least a multitude of lighting systems, e.g. as in the case of grey or brown; or it could be a limitation of the particular lighting system being used (or a particular one or more of the luminaires of the lighting system), e.g. the lighting system cannot render deep reds. Either way, the source image is modified in dependence on whether, or to what extent, the one or more colors in question are capable of being rendered.

This advantageously lets the user see the range of available color options within an image before making a particular selection of a particular color. I.e. it is recognized herein that it would be preferable to present to the user with the options of the available colors from which he or she can select, as opposed to simply automatically selecting a different color without the user's permission.

For instance, this may be used to provide the user with the choice of selecting a region with one of the colors the lighting system can already render, or selecting one of the regions with a modified color.

Therefore in embodiments the respective color in one or more of said regions of the displayed image comprises: a respective replacement color capable of being rendered through said illumination, replacing a respective source color in the source image that is not capable of being rendered through said illumination; or at least a respective replacement color which is capable of being rendered more faithfully through said illumination, replacing a respective source color in the source image that is capable of being rendered less faithfully through said illumination.

The respective replacement color in each of one or more of said regions of the displayed image may replace the respective source color in a same region of the source image, being spatially coincident with the region of the respective replacement color in the displayed image. And/or, each of one or more of said regions in the displayed image may comprise a special control region superimposed over the source image, showing the respective replacement color, but not being spatially coincident with any region of the respective source color in the source image.

As another alternative or additional realization of the modification, the displayed image may be modified relative to the source image to remove one or more colors that are not renderable through said illumination, or not renderable within a threshold error. For example this may comprise the displayed image being cropped relative to the source image to remove at least one of said one or more colors that are not renderable through said illumination, or not renderable within the threshold error.

As another alternative or additional realization of the modification, the displayed image may be modified relative to the source image to indicate, to the user, one or more respective regions in the source image whose color can be rendered through said illumination, or can be rendered within a threshold error. E.g. this may comprise highlighting the region(s) in question, such as by drawing an outline around them, or superimposing icons or other such indicators over or adjacent to these regions.

In embodiments, the user terminal may comprise a device for providing the source image to the controller (e.g. a camera for capturing the image or a memory storing the image), and the controller may be configured to perform said determination of the displayed image by generating the displayed image at the user terminal based on the source image as provided by said device (where the generating of the displayed image may comprise changing only a part or the whole of the source image).

Alternatively, the controller may be configured to perform said determination of the displayed image by receiving the displayed image from a server, the server having generated the displayed image at the server based on the source image.

In the case where the displayed image is generated at the user terminal, an indication of the insusceptibility of said one or more colors to being rendered may be pre-stored at the user terminal, and the controller may be configured to perform said generating of the displayed imaged to account for said insusceptibility as indicated by the indication pre-stored at the user terminal.

Alternatively, the communications interface may be configured to receive an indication of the insusceptibility of said one or more colors to being rendered from the lighting system, and the controller may be configured to perform said generating of the displayed imaged to account for said insusceptibility as indicated by the lighting system via the communications interface.

In embodiments, the insusceptibility of said one or more colors to being rendered may be a predetermined assumption based on an inherent nature of said one or more colors, the displayed image being determined without specific information about an ability of the particular lighting system being controlled to render said one or more colors (i.e. without knowledge of the actual capability of the specific lighting system in question).

Alternatively the insusceptibility of said one or more colors to being rendered may be based on specific information about an ability of the particular lighting system or a particular one or more of the luminaires being controlled to render said one or more colors through said illumination (i.e. based on knowledge of the actual capability of the specific lighting system, e.g. based on an indication of the capability received by the controller on the user terminal from the lighting system via said communications interface). Hence the modified image is modification of the source image modified to account for said ability of the particular lighting system or the particular one or more luminaires to render the one or more colors through said illumination.

In further embodiments, the lighting system comprises a plurality of luminaires, and the controller may be configured to determine a respective version of the modified image for each of two of more of the luminaires or each of two or more subsets of the luminaires, each version being a modification of the source image modified to account for an ability of the respective luminaire or subset to render the one or more colors through said illumination.

According to another aspect disclosed herein, there may be provided a method of controlling a lighting system comprising one or more luminaires for illuminating an environment, the method comprising: outputting a displayed image to a user on a screen of a user interface; allowing the user to select a region from amongst a plurality of regions in the displayed image each having a respective color; and controlling one or more of the luminaires of the lighting system to render, through an emitted illumination, the color of the region selected by the user from the displayed image; wherein the displayed image is determined based on the source image, the displayed image being a modification of the source image modified to account for an insusceptibility of one or more colors in the source image to be rendered through said illumination.

In embodiments, the method may further comprise steps in accordance with any of the user terminal or system features disclosed herein.

According to another aspect disclosed herein, there is provided a computer program product for controlling a lighting system comprising one or more luminaires for illuminating an environment, the computer program product being embodied on a computer-readable storage medium and configured so as when run on one or more processors to perform operations of: outputting a displayed image to a user on a screen of a user interface; allowing the user to select a region from amongst a plurality of regions in the displayed image each having a respective color; and controlling one or more of the luminaires of the lighting system to render, by emitting illumination, the color of the region selected by the user from the displayed image; wherein the displayed image is determined based on the source image, the displayed image being a modification of the source image modified to account for an insusceptibility of one or more colors in the source image to be rendered through said illumination.

In embodiments, the computer program may be further configured to operate in accordance with any of the user terminal or system features disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
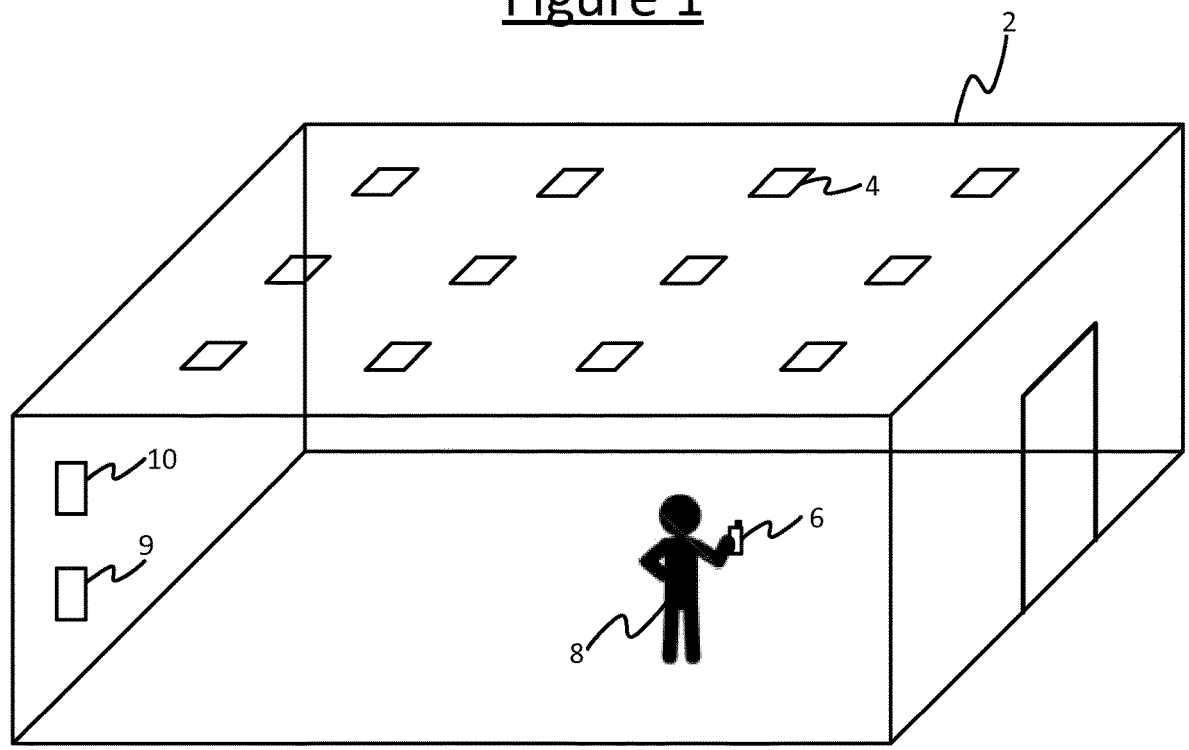
FIG. 1 is a schematic illustration of a lighting system.

FIG. 1 illustrates an example lighting system in relation to which the disclosed techniques may be implemented. The system comprises one or more luminaires 4 installed in an environment 2, arranged to emit light in order to illuminate that environment 2. The environment 2 may be an indoor space such as one or more rooms and/or corridors, or an outdoor space such as a park or garden, or a partially covered space such as a stadium or gazebo, or any other space such as an interior of a vehicle, or any combination of these. Each of the luminaires 4 comprises at least one respective light source such as an LED-based lamp, gas-discharge lamp or filament bulb, plus any associated housing or support. Each of the luminaires 4 may take any suitable form such as a ceiling or wall mounted luminaire, a free standing luminaire, a wall washer, or a less conventional form such as a luminaire built into a surface or an item of furniture, or any other type of illumination device for emitting illumination into the environment 2 so as to illuminate the environment 2.

To control the lighting system, a user terminal 6 is operated by a user 8. For example the user terminal 6 may take the form of a mobile user terminal such as a smartphone, tablet or laptop, or a dedicated remote control unit for the lighting system; or alternatively the user terminal 6 could be a non-mobile terminal such as a desktop computer or a wall-panel. The user terminal 6 is configured to be able to control the illumination emitted by one or more of the luminaires 4 in the lighting system. This includes at least being able to control the color of the illumination, and optionally one or more other properties such as overall intensity or a dynamic (time-varying) effect in the illumination. The user terminal 6 may be required to be present in the environment 2 to control the luminaire(s), but that is not necessarily so in all possible embodiments. To enable the user terminal 6 to control the illumination, there are a number of options, e.g. as follows.

Figure 2:
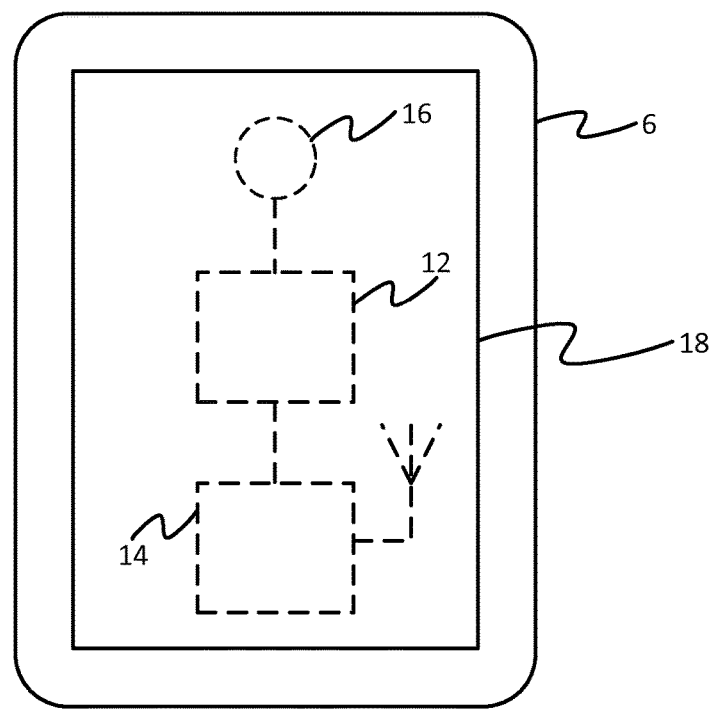
FIG. 2 is a schematic block diagram of a user terminal.

FIG. 2 illustrates the user terminal 6 in more detail. The user terminal 6 comprises a controller 12, and communications interface 14 for communicating with the lighting system; the controller being operatively coupled to the communications interface in order to perform, via said interface 14, the described control of the illumination emitted by one or more of the system's one or more luminaires 4. The communications interface 14 may comprise a wireless transmitter or transceiver such as a Wi-Fi, a ZigBee or Bluetooth interface; or a wired connection such as an Ethernet, DMX or DALI interface. The controller 12 may be implemented in software code stored on a memory (comprising one or more storage devices) of the user terminal 6 and arranged so as when run on a processor (comprising one or more processing units) of the user terminal 6 to perform operations in accordance with the techniques disclosed herein. Alternatively the controller 12 may be implemented in dedicated hardware circuitry, or configurable or reconfigurable circuitry such as a PGA or FPGA, or any combination of software and hardware.

The user terminal 6 also comprises a device 16 for providing an image to the controller 12, enabling the controller to control the color of the illumination based on one or more colors in the image, as will be discussed in more detail shortly. In embodiments this device 16 is a camera, preferably a camera built into the housing of the user terminal 6 such as in the case where the user terminal 6 is a mobile terminal (though alternatively it could be a camera such as a webcam external to the housing of the user terminal 6). Alternatively the device 16 for providing the image could be a memory storing the image, e.g. the image having been downloaded to the memory of the user terminal 6 from a network such as the Internet, or having been copied to the memory of the user terminal from another device such as a memory card or key. The following will be described in terms of a camera 16, but it will be appreciated that this is not limiting in all possible embodiments.

Further, the user terminal 6 comprises a user interface 18 operatively coupled to the controller 12. The user interface comprises a screen and means for receiving a user input indicating one or more regions of an image displayed on the screen. For example, the user interface 18 may comprise a touch screen enabling the user 6 to select a desired region of the image displayed on the screen by touching that region, or a point-and-click user interface comprising a mouse, track pad or tracker ball or the like allowing the user to direct a cursor over the desired region and to select that region by clicking a button with the cursor so positioned. As will be discussed in more detail shortly, the controller 12 is configured to control the color of the illumination to match (at least to an approximation) the color of the region selected by the user from the displayed image i.e. to render that color.

In controlling the illumination emitted by the lighting system, the controller 12 on the user terminal 6 may use the interface 14 to communicate a lighting control request to each individual one of the one or more luminaires 4 being controlled, to control them individually. Alternatively the controller 12 on the user terminal 6 may perform the control by using the interface 14 to communicate a lighting control request to a central control module 10 (sometimes called a lighting bridge), which processes the lighting control request in order to in turn control the relevant one or more luminaires 4 accordingly. The central control module 10 may be implemented in a dedicated control unit installed in the environment 2, e.g. a wall-mounted control unit; or may be implemented on a server comprising one or more server units at one or more sites, either in the environment (e.g. same building) and/or off-site at a remote location.

Either way, the request may be acted upon unconditionally, or one or more conditions may be applied by the control module 10 or luminaire(s) 4. E.g. in the case where the control goes via a central control module 10, the central control module 10 may be arranged to verify an identity of the user terminal 6 or its user 8 before allowing the control; and/or may be arranged to verify that the user terminal 6 or its user 8 is found within a certain spatial or geographical region before allowing the control (e.g. based on an indoor positioning network or a presence sensing system), such as to verify that the user terminal 6 or its user 6 is located within the same environment 2 as the lighting 4 being controlled (e.g. the same room or building).

In the case of a wireless interface 14, the communication may be direct with a corresponding receiver or transceiver on each luminaire 4 or the central control module 10, e.g. using ZigBee or Bluetooth as the wireless access technology; or via an intermediate wireless router 9 disposed in the environment 2, e.g. using Wi-Fi as the wireless access technology (though these technologies are not limited to these respective direct or router-based arrangements).

Whether the control is performed via a central control module 10 or via communication individually with the one or more luminaires 4 being controlled, the control of the color may comprise either: controlling the color of the illumination emitted by each individual one of the one or more luminaires 4 to change its respective color, or controlling the color of the overall illumination created by multiple luminaires 4. In the former case, this is achieved by controlling individual elements of a given luminaire 4, such as red (R), green (G) and blue (B) elements (e.g. separate sets of RGB LEDs in an array of LEDs in an LED-based lamp), or any other mixture of colored and white-colored light sources. In the latter case, the color in question is an effect of the illumination from different luminaires 4 blending on a certain surface or at a certain point in space.

The target color to be created through the illumination is selected based on an image presented to the user 6 via the user interface 18. The controller 12 on the user terminal 12 is arranged to receive an image captured by the camera 16 (or retrieved from memory) and display it to the user 8 on the screen of the user interface 18. The user then selects a desired region of the image having a color that he or she wishes to render through the illumination from one or more luminaires 4 of the lighting system (which luminaires 4 are controlled could also be selected by the user, or could be predetermined or selected by the central control module 10).

The selecting of the desired region could be performed by the user selecting a certain point in the image (e.g. clicking or touching a certain point) and taking a pixel at that point, or an area comprising a plurality of pixels around that point. Alternatively the region could be selected in terms of its bounds, e.g. drawing around a region of the image with a mouse pointer or touch screen. The color of the selected region could also be defined in various ways. For example, this may be the color of the pixel at the exact point or the center of the region selected by the user, or could be a color representative of the pixel colors from multiple pixels in the region, e.g. a mean, median or modal value on each color space channel; such as a mean, median or modal value of each of the RGB channels; or of each of the luminance and chrominance channels (YUV); or of each of the hue, saturation and brightness channels.

However selected, the controller 12 on the user terminal 6 then transmits a lighting control request indicating the target color (either exactly or within a certain approximation) to the lighting system, either individually to the one or more luminaires 4 being controlled or via the centralized lighting control module 10, based on one of the various possibilities discussed above. In response, the lighting system then renders the target color through the illumination from the one or more luminaires 4 in question. The target color may be communicated to the lighting system by sending coordinates in any suitable color space, such as RGB values; or luminance and chrominance values (YUV); or hue, saturation and intensity values; or x-y values, which are mapped onto a respective color gamut of the lighting system or a particular one of its luminaires (where the gamut is a predetermined subset of colors, e.g. the complete subset, that can be accurately represented by the lighting system). Or the color may even be communicated to the lighting system in other terms, e.g. by sending a predetermined color name or ID understood by the lighting system, etc.

Note: the target color which the controller 12 is controlling the one or more luminaires 4 to create—i.e. the color to be rendered—may be the color as immediately emitted from a given one of the luminaires 4 or each individual one of a plurality of the luminaires 4, or alternatively may be the color created by the illumination from a given one of the luminaires 4 or the combined illumination from a plurality of the luminaires 4 as appearing on a given surface in the environment 2 or as would be detected at a given point in space. In the latter cases, this may depend on a color of the surface, and/or any mixing of the illumination from different ones of the controlled luminaires 4 and/or other light sources.

As discussed above, the user terminal 6 provides the functionality of a color picker. In the case where this functionality is implemented in software arranged to run on the user terminal 6, this software may be referred to as a color picker application (sometimes referred to as an "app", especially in the case where the user terminal 6 is a smartphone or tablet). If the user 8 photographs a scene that he or she likes or is inspired by (or perhaps obtains an image by other means, such as downloading from the Internet), then the user 8 can simply select a region from that image having a color that he or she desires for the lighting in the environment 2, and the controller 12 and lighting system 4, 10 will automatically generate the desired illumination without the user having to understand the intricacies of lighting control.

However, certain colors are difficult to render by means of a lighting system. This may be due to an inherent lack of renderability of certain colors, e.g. grey or brown, or may be a limitation imposed by a property of the system or the environment being illuminated, e.g. colors with deep saturation may not be rendered well by the system.

For example, certain colors may be difficult to render due to limitations in the output of the one or more luminaires 4 being controlled. E.g. a red light source could in fact be more orange and as such creating deep red colors may be difficult. As another example, there could be limitations on the amount of blue light emitted to avoid damage (in the long run) to the reflector due to the high energy of the blue light. Other colors are impossible to render with a lighting device, such as brown or grey.

As another example, certain colors can be rendered truthfully, yet when seen at the same time as another color rendered by another lighting device might look unimpressive. As an example, when a first luminaire renders a color truthfully yet this is a color to which the human eye is relatively insensitive, then the light output would seem unimpressive if a second luminaire next to it is set to render a color to which the human eye is extremely sensitive. Hence especially when multiple colors are selected each to be emitted by a respective luminaire, the inability to render certain colors may become apparent to the user.

The following discloses a way to help the user select colors that can be rendered well through the light lighting system that he or she is currently controlling. To do this, there is provided a method comprising the steps of (i) determining the light rendering capabilities (color and lux output) of the lighting system; (ii) analyzing an image to determine which areas of the image (e.g. which pixels) are not renderable (e.g. can't be rendered at all, or can be rendered but not to satisfaction); and (iii) adapting the image displayed to the user by removing those areas that are not renderable to allow the user to select a color using a color picker. In embodiments the removed areas are replaced by colors that are renderable.

An example is that in an image with a grey background, the grey background is removed and is therefore not selectable. In an example of the embodiment where the grey color is replaced, the image can be adapted such that the grey background is replaced with a subtle shade of blue (which then is selectable).

Figure 3:
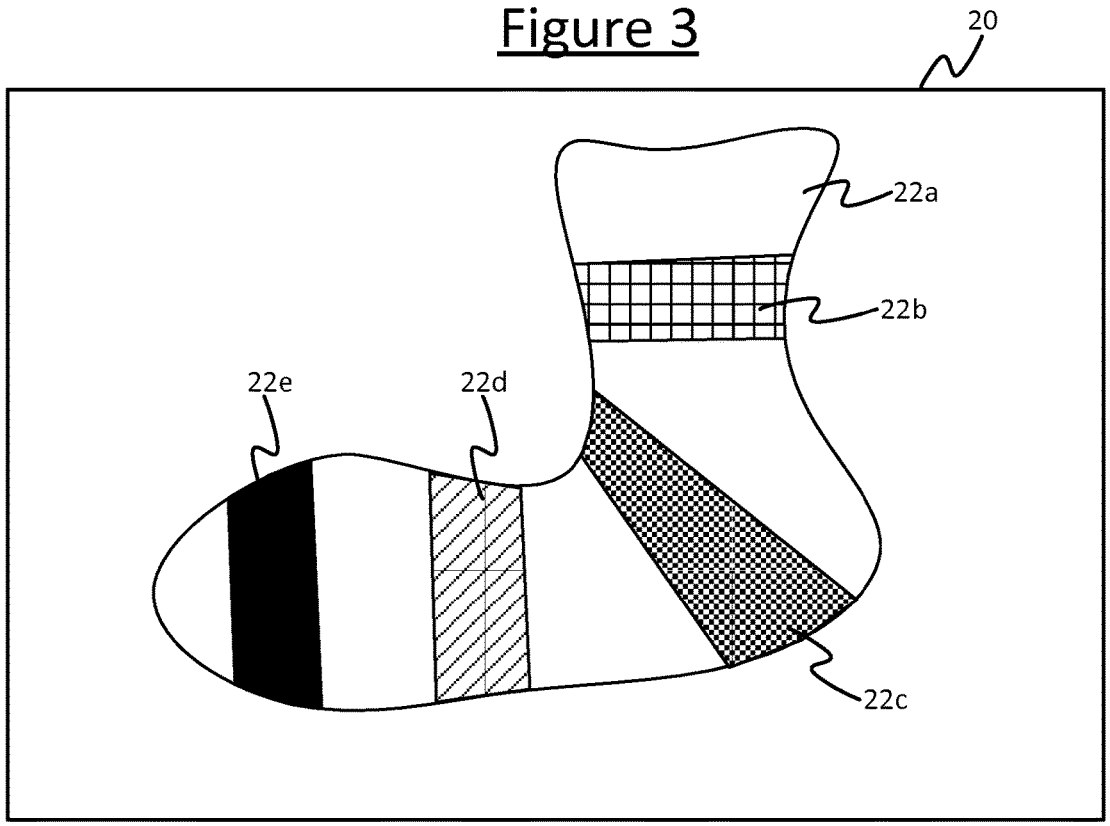
FIG. 3 is a schematic illustration of a modification of a source image.
Figure 3:
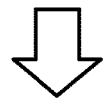
Figure 3:
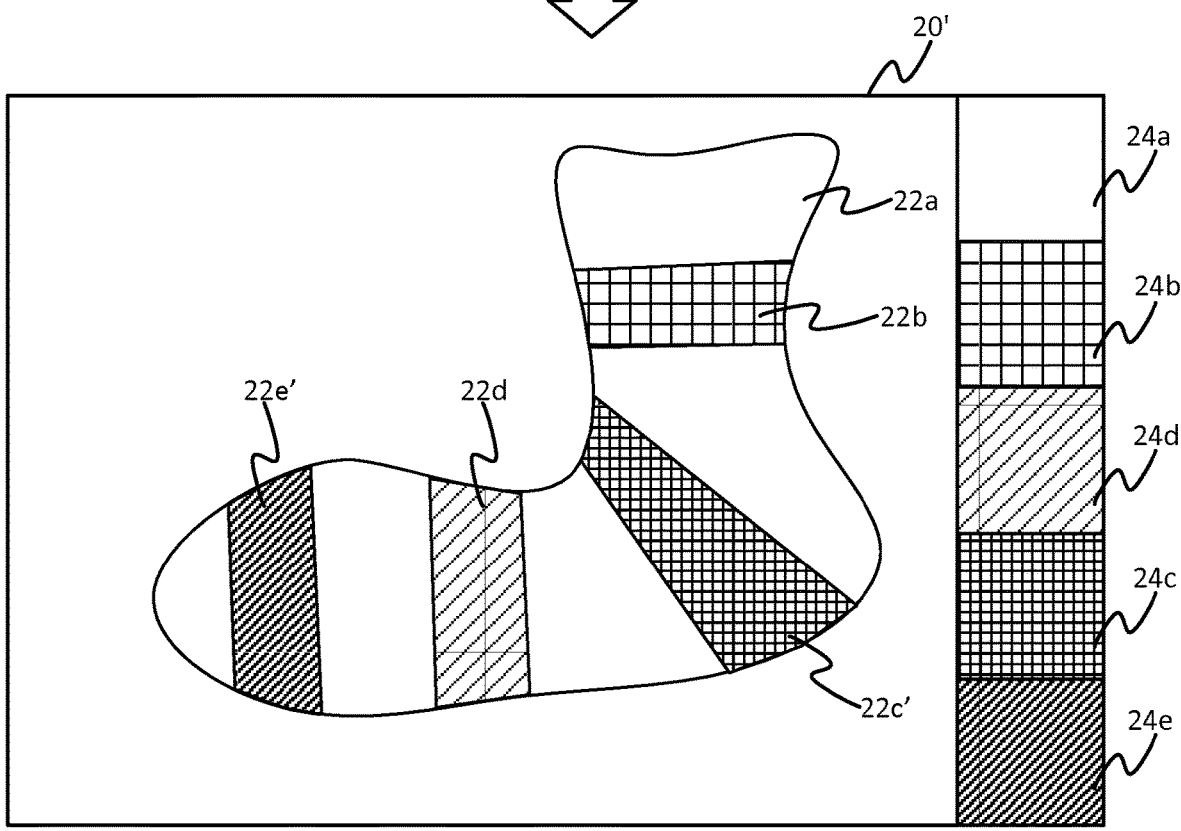

Another example is described in more detail in relation to FIG. 3.

The controller 12 on the user terminal 6 first acquires a source image 20 (the "original" image), e.g. from the camera 16 or from an internal or external memory. For instance, the user 8 takes a picture of a stripy sock having regions of different colors 22a, 22b, 22c, 22d, 22e. The top image in FIG. 3 shows the original picture 20. Note: for purpose of reproduction in black and white drawings, different color regions are shown with solid black and white, cross-hatching and checkering. In the example to be described, the regions labelled 22a represent blue, the region labelled 22b yellow, the region labelled 22c a deep red, the region labelled 22d green and the region labelled 22e black.

The controller 12 determines the capacity of the colors in the source image 20 to be rendered, i.e. determines what colors can or cannot be rendered (or cannot be rendered to satisfaction). This could be expressed in terms of any one or more combinations of color space values or combinations of ranges of values that cannot be rendered, or conversely that can be rendered (where it is assumed that any color not specified cannot be rendered). E.g. this could be expressed in terms of a range of values on each channel in RGB color space; or a range of values on each channel in YUV color space; or a range of values for each of the hue, saturation and brightness; or as x-y coordinates in a gamut of the lighting system. Some or all of these renderable or unrenderable colors may be pre-stored in a local memory of the user terminal 6, based on pre-determined knowledge of what colors are inherently renderable or unrenderable, and/or pre-determined knowledge of what colors the particular lighting system or a particular one or more of the luminaires 4 being controlled is/are able or not able to render. Alternatively or additionally, some or all of the renderable or unrenderable colors may be indicated to the controller 12 on the user terminal 6 from the lighting system via the communications interface 13 (e.g. from a central control module 10 of the lighting system or from each individual luminaire (4).

Either way, based on this information, the controller 12 then generates a modified version 20' of the source image 20 in which the unrenderable colors are replaced with colors that the lighting system can render. The bottom image in FIG. 3 shows the converted image 20', suitable for lighting systems that are capable of rendering white tones and colors. For instance, it is determined that the black region 22e is unrenderable, and that the lighting system is also unable to render the deep red region 22c. The controller 12 therefore replaces the black region 22e with a renderable color 22e' such as purple or violet, and replaces the deep red region 22c with another renderable color such as pink or orange. Assuming the shape and position of the regions 22c, 22e is not adapted and only the colors are changed, the replaced region is made spatially coincident with the respective replaced region (not just happening to partially overlap). I.e. the replaced regions are existing parts of the source image, just with the color adapted. The user can then select any desired region from the modified image 20' (e.g. by clicking or touching the desired region), and the lighting system will render this color from the modified image through the lighting system 4, 10.

Alternatively or additionally, the controller 12 may superimpose artificially generated regions 24a, 24b, 24c', 24d, 24e' showing the renderable colors 22a, 22b, 22c', 22d, 22e' respectively in the modified image 20', but in different locations than the regions having those respective colors 22a, 22b, 22c, 22d, 22e in the original image 20. E.g. the right-hand side of the modified image 20' in FIG. 2 shows a selection of colors from the image that are specifically suitable for this type of lighting. These act as control regions that the user can select (e.g. click or touch) to choose the color for the lighting.

It will be appreciated that the above embodiments have been described only by way of example.

For instance, there are other ways the image could be modified to remove or replace unrenderable colors. In one such example, the image is cropped such that only an area of the image comprising colors that are renderable is displayed. In another example, the image is automatically converted to a color palette of colors that can be rendered well by the light source, and the user can select from those colors. In another example, areas of the picture that have colors that can be rendered well are highlighted to the user, e.g. by outlining them, or placing color picker icons over them. In another example, the other, unrenderable areas are faded and/or blurred (but optionally if the user moves a picker curser to this area, this effect shall be removed). In yet another example, if the lighting system is only capable of rendering a single warm white color, the image may be converted to grey-scale or sepia to reflect the characteristics of that lighting system.

Note also that "colors" as referred to herein most broadly means different sets of color space values (or different ranges of such) on one or more of the color space channels, which encompasses the possibility of different shades, i.e. covers colors that may be different on the chromatic and/or achromatic channels and is not limited to only chromatically different colors. Even if only the achromatic channel is different, this can still create a different user perception. So for example different shades of red (dark red to light red) may be considered different colors to one another; and/or white, black, and different shades of grey (light grey to dark grey, etc.) may all be considered different colors to one another. Colors having different ratios of red green and blue, i.e. different hue and/or saturation, may be referred to as chromatically different colors.

Further, wherever it is said above that the color is renderable or unrenderable or such like, this includes the possibility of being within or beyond some tolerable margin of error respectively, e.g. where error may be measured on any one or more of the color channels in any suitable color space (e.g. RGB, YUV, hue-saturation-brightness). I.e. this includes the idea that the color may be faithfully or unfaithfully rendered according to some predetermined criterion or criteria.

Further, while the above has been described in terms of the controller 12 on the user terminal 6 generating the modified image 20', in alternative embodiments this task could be offloaded to a server (not shown). In this case, the controller 12 on the user terminal 6 may submit the source image 20 to the server (e.g. having been captured by the user terminal's camera 16) or the source image 20 may already be hosted at the server. Either way, the controller 12 on the user terminal 6 determines the modified image by requesting and receiving the modified image 20' from the server (via the same communications interface 14 used to control the lighting or another communications interface), the modified image 20' having been generated at the server based on the source image 20.

Further, note that where it is said that the displayed image is a modification of the source image, or such like, this does not necessarily mean the whole area of the source image is modified. Rather, in general this may mean that only a part of the source image is modified (i.e. only one or some regions of the source image are modified while one or some other regions of the source image remain verbatim in the displayed image, e.g. See FIG. 3), or potentially that the whole image has been changed. Either way, note that even if the whole image area is adapted, the displayed image is still a modification of the source image as opposed to a replacement e.g. the underlying shape of the objects from the source image remains in the displayed image (e.g. it is still an image of the same sock in the example of FIG. 3) while only the colors are changed.

Furthermore, note that the lighting system may comprise only a single luminaire 4, or multiple luminaires 4. Anywhere above where it is described that the lighting system is controlled to render a certain selected color, then in the case where the lighting system comprises multiple luminaires 4, this may mean controlling only a particular selected one of the luminaires to render the selected color, or controlling a particular selected subset of the luminaires to render the selected color through a combination of their illumination, or control all of the luminaires of the system to render the color though a combination of their illumination. Similarly, anywhere above where it is described that the image is adapted to the capability of the lighting system, or such like, this may mean adapting only to the capability of a particular selected one of the luminaires to render the selected color, or adapting to a capability of a particular selected subset of the luminaires to render the selected color, or adapting to the capability all of the luminaires of the system to render the color. Also, where adapting the image to the capability of more than one luminaire, this may comprise either adapting in dependence on each of their individual capabilities or a combined capability to render the color through a combination of their illumination.

For instance, the lighting system may comprise of a diversity of luminaires, where each luminaire offers a different color gamut (can output different colors). E.g. the system may comprise any combination of: one or more luminaires capable of emitting only white light and a limited color set (limited gamut), one or more luminaires capable of emitting white light only, and/or one or more luminaires with a larger gamut than the limited color set (e.g. also including greens but with no white). In such a mixed system the displayed image could be adjusted relative to the source image in either of the following ways (not exhaustive).

In a first example, the displayed image 20' only displays the overlapping characteristics of two or more luminaires 4 (e.g. only the overlapping capabilities of two or more particular selected luminaires 4, or only the overlapping capabilities of all the luminaires 4 in the system). That is, only if a color is renderable by all of the two or more luminaires in question is that color included in the modified image 20'.

In a second example, the user 8 has the ability to select a particular one of the multiple luminaires 4 to be the luminaire currently controlled (e.g. via the user terminal 6), and the displayed image 20' changes based on the capabilities of the current luminaire 4 that the user has selected to control. In embodiments, this would mean that multiple different versions of the displayed image 20' are generated from a single source image 20. E.g., if a user 8 selects an icon corresponding to a particular luminaire 4 (e.g. overlaid over it in an augmented reality view of the environment 2 displayed through the user device 6), then the output image 20' changes to match the characteristics of the associated luminaire 4.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A user terminal comprising:
a communications interface for communicating with a lighting system comprising one or more luminaires for illuminating an environment;
a user interface comprising a screen, the user interface being configured to output a displayed image to a user of the user terminal on said screen, and to allow the user to select a region from amongst a plurality of regions in the displayed image each having a respective color; and
a controller configured to control one or more of the luminaires of the lighting system, via said communications interface, to emit illumination for rendering the color of the region selected by the user from the displayed image;
wherein the controller is configured to determine the displayed image based on a source image, the displayed image being a modification of the source image modified to account for an insusceptibility of one or more colors in the source image to be rendered through said illumination, and
wherein the communications interface is configured to receive an indication of the insusceptibility of said one or more colors to being rendered from the lighting system, and the controller is configured to determine the displayed image to account for said insusceptibility as indicated by the lighting system via the communications interface.

2. The user terminal of claim 1, wherein the respective color in one or more of said regions of the displayed image comprises: a respective replacement color capable of being rendered through said illumination, or replacing a respective source color in the source image that is not capable of being rendered through said illumination.

3. The user terminal of claim 2, wherein the respective replacement color in each of one or more of said regions of the displayed image replaces the respective source color in a same region of the source image, being spatially coincident with the region of the respective replacement color in the displayed image.

4. The user terminal of claim 2, wherein each of one or more of said regions in the displayed image comprises a control region superimposed over the source image, showing the respective replacement color, but not being spatially coincident with any region of the respective source color in the source image.

5. The user terminal of claim 1, wherein the displayed image is modified relative to the source image to remove one or more colors that are not renderable through said illumination, or not renderable within a threshold error.

6. The user terminal of claim 1, wherein the displayed image is modified relative to the source image to indicate, to the user, one or more respective regions in the source image whose color can be rendered through said illumination, or can be rendered within a threshold error.

7. The user terminal of claim 1, wherein the user terminal comprises a device for providing the source image to the controller, and the controller is configured to perform said determination of the displayed image by generating the displayed image at the user terminal based on the source image as provided by said device.

8. The user terminal of claim 7, wherein an indication of the insusceptibility of said one or more colors to being rendered is pre-stored at the user terminal, and the controller is configured to perform said generating of the displayed imaged to account for said insusceptibility as indicated by the indication pre-stored at the user terminal.

9. The user terminal of any of claim 1, wherein the controller is configured to perform said determination of the displayed image by receiving the displayed image from a server, the server having generated the displayed image at the server based on the source image.

10. The user terminal of claim 1, wherein the insusceptibility of said one or more colors to being rendered is a predetermined assumption based on an inherent nature of said one or more colors, the displayed image being determined without specific information about an ability of the particular lighting system nor any particular one of the one or more luminaires being controlled to render said one or more colors through said illumination.

11. The user terminal of claim 1, wherein the insusceptibility of said one or more colors to being rendered is based on specific information about an ability of the particular lighting system or a particular one or more of the luminaires being controlled to render said one or more colors through said illumination, the modified image being a modification of the source image modified to account for said ability of the particular lighting system or the particular one or more luminaires to render the one or more colors through said illumination.

12. The user terminal of claim 11, wherein the lighting system comprises a plurality of luminaires, and the controller is configured to determine a respective version of the modified image for each of two of more of the luminaires or each of two or more subsets of the luminaires, each version being a modification of the source image modified to account for an ability of the respective luminaire or subset to render the one or more colors through said illumination.

13. A method of controlling a lighting system comprising one or more luminaires for illuminating an environment, the method comprising:
outputting a displayed image to a user on a screen of a user interface;
allowing the user to select a region from amongst a plurality of regions in the displayed image each having a respective color; and
controlling one or more of the luminaires of the lighting system to render, through an emitted illumination, the color of the region selected by the user from the displayed image;
wherein the displayed image is determined based on a source image, the displayed image being a modification of the source image modified to account for an insusceptibility of one or more colors in the source image to be rendered through said illumination, and
wherein an indication of the insusceptibility of said one or more colors to being rendered is received from the lighting system, and the displayed image is determined to account for said insusceptibility as indicated by the lighting system.

14. A computer program product for controlling a lighting system comprising one or more luminaires for illuminating an environment, the computer program product being embodied on a computer-readable storage medium and configured so as when run on one or more processors to perform operations of:
outputting a displayed image to a user on a screen of a user interface;
allowing the user to select a region from amongst a plurality of regions in the displayed image each having a respective color; and
controlling one or more of the luminaires of the lighting system to render, by emitting illumination, the color of the region selected by the user from the displayed image;
wherein the displayed image is determined based on a source image, the displayed image being a modification of the source image modified to account for an insusceptibility of one or more colors in the source image to be rendered through said illumination, and
wherein an indication of the insusceptibility of said one or more colors to being rendered is received from the lighting system, and the displayed image is determined to account for said insusceptibility as indicated by the lighting system.

* * * * *